United States Patent [19]
Rajecki

[11] Patent Number: 4,989,905
[45] Date of Patent: Feb. 5, 1991

[54] FITTING FOR CORRUGATED TUBING

[75] Inventor: James A. Rajecki, Parma, Ohio

[73] Assignee: Lamson & Sessions Co., Cleveland, Ohio

[21] Appl. No.: 475,237

[22] Filed: Feb. 5, 1990

[51] Int. Cl.$^5$ .............................................. F16L 35/00
[52] U.S. Cl. .................................... 285/319; 285/423; 285/903; 285/921
[58] Field of Search ............... 285/423, 319, 903, 921, 285/161

[56] References Cited

U.S. PATENT DOCUMENTS

| | | | |
|---|---|---|---|
| 4,368,904 | 1/1983 | Lanz | 285/903 |
| 4,647,074 | 3/1987 | Pate et al. | 285/903 |
| 4,723,796 | 2/1988 | Nattel | 285/161 |
| 4,753,458 | 6/1988 | Case et al. | 285/319 |
| 4,829,145 | 5/1989 | Mitchell et al. | 285/903 |
| 4,834,423 | 5/1989 | Deland | 285/319 |
| 4,836,580 | 1/1989 | Farrell | 285/319 |
| 4,893,845 | 1/1990 | Bartholomew | 285/319 |
| 4,904,000 | 2/1990 | Matsui | 285/903 |
| 4,923,227 | 5/1990 | Petty et al. | 285/903 |

FOREIGN PATENT DOCUMENTS 2123106  1/1984  United Kingdom ................ 285/903

Primary Examiner—Eric K. Nicholson
Attorney, Agent, or Firm—Fay; Sharpe, Beall, Fagan, Minnich & McKee

[57] ABSTRACT

A fitting connection for joining plastic tubing to associated structure comprises a main fitting body having an axially inwardly extending cylindrical chamber with an inner end portion of a diameter $d_1$ terminating at its innermost end in a radially inward extending wall. The outer end of the chamber opens to the exterior of the body and has an open diameter $d_2$ which is larger than $d_1$ with a shoulder at the juncture between the inner and outer end portions of the chamber. Plastic tubing having a circumferential corrugation adjacent an end portion thereof extends axially into the chamber with the innermost end of the tubing abutting the wall. A retaining ring acts to retain the tubing in the fitting body and includes a sleeve received in the outer portion of the chamber with the innermost end of the sleeve in engagement with the shoulder and a plurality of resilient tabs having free ends extending toward the shoulder. Radially inward extending first detents are carried on the tabs adjacent their free ends at a location to enter into the circumferential corrugation on the tubing and radially outward extending second detents are carried on the exterior of the tabs to extend into radially open slots formed in the fitting body adjacent the shoulder for preventing axial withdrawal of the retaining ring and the tubing.

5 Claims, 2 Drawing Sheets

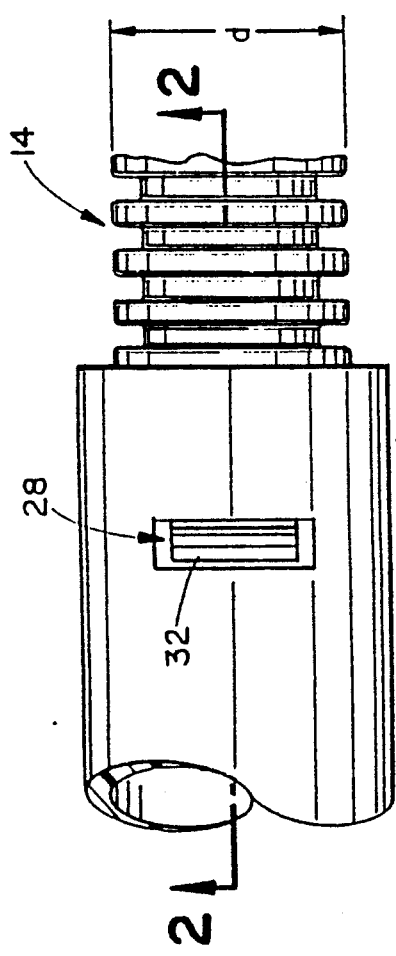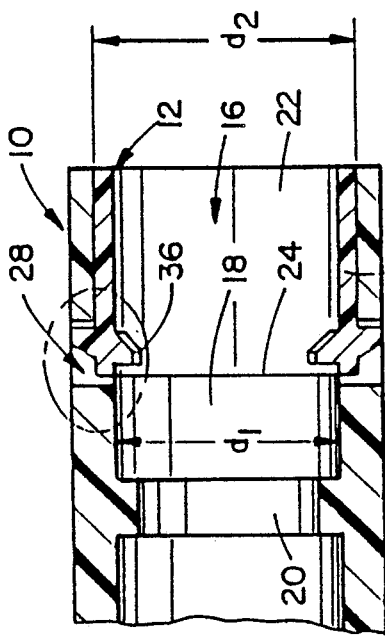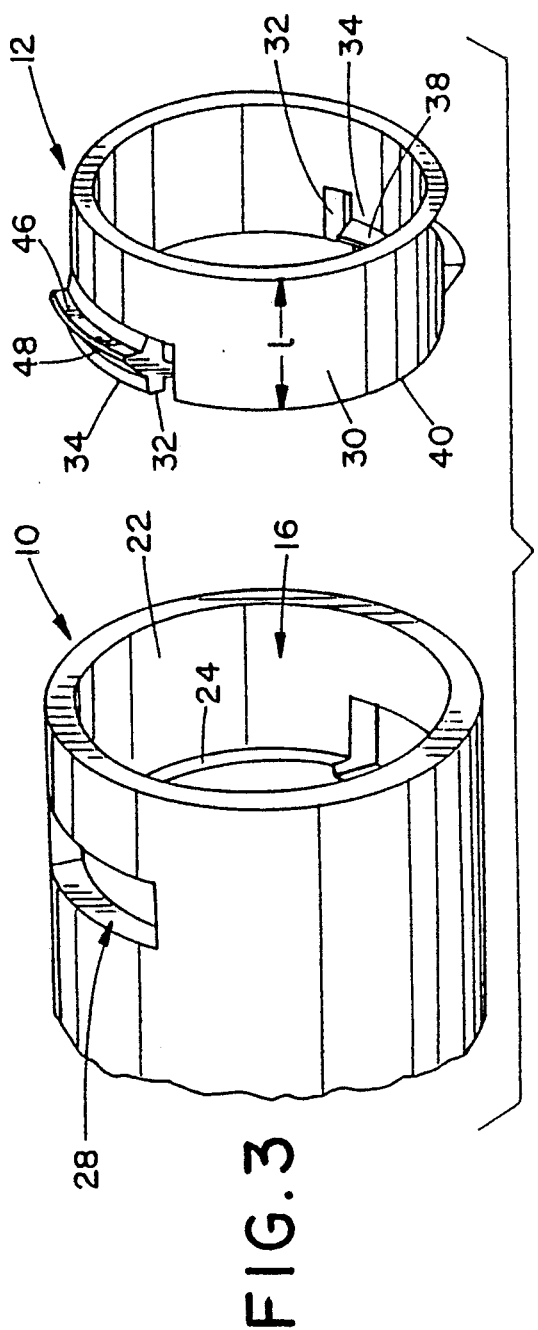

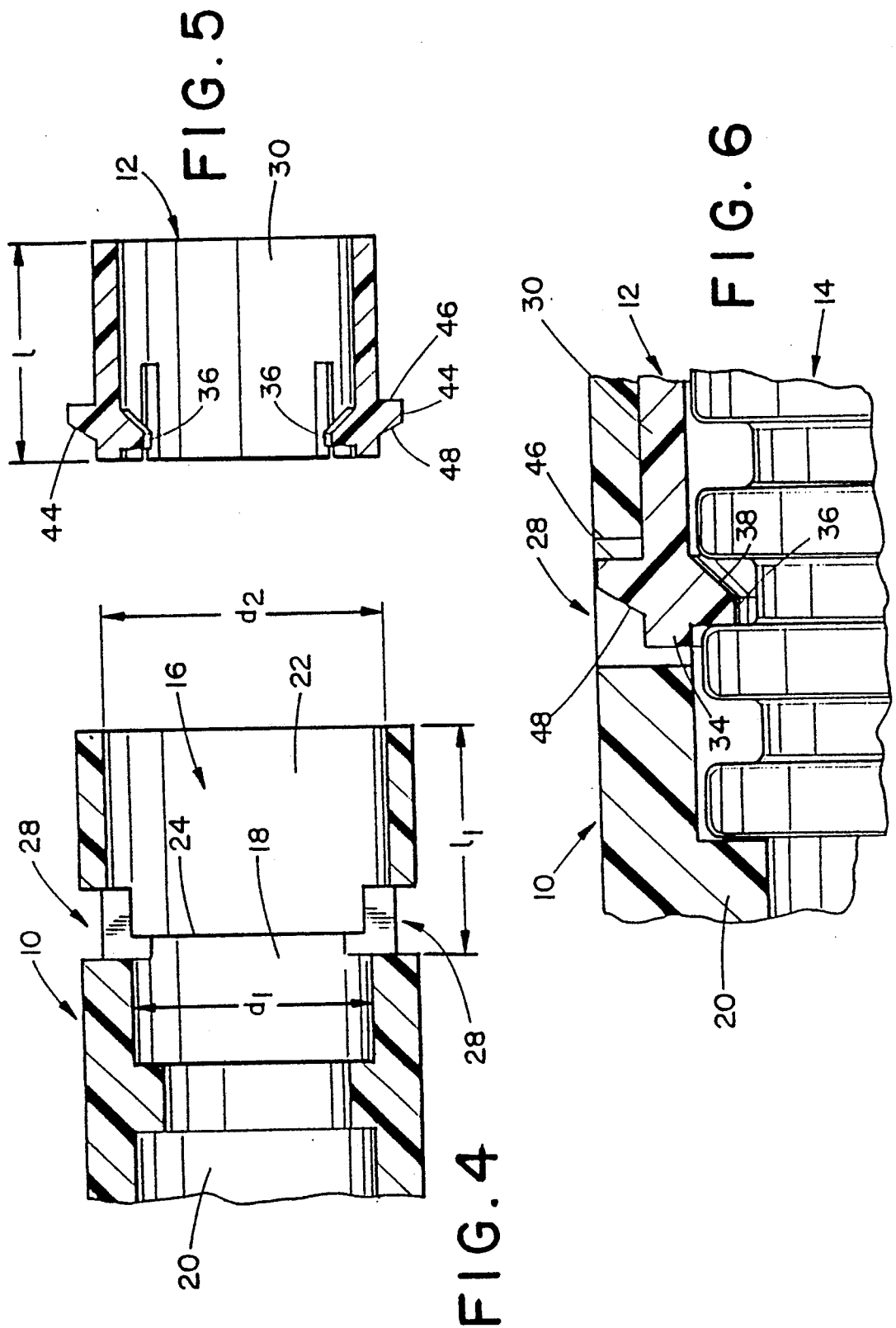

FITTING FOR CORRUGATED TUBING

BACKGROUND OF THE INVENTION

The subject invention is directed toward the art of pipe joints and couplings and, more particularly, to a fitting construction for connecting corrugated tubing to associated structure.

The invention is particularly suited for use with plastic corrugated tubing of the type used as electrical conduit and will be described with reference thereto; however, as will become apparent, the invention could be used with other types of tubing used for other purposes.

Corrugated and non-corrugated thermoplastic tubing is widely used as electrical conduit for protecting wiring and cables extending between various control boxes, switch boxes, and the like. To facilitate the use and installation of such tubing it has been desirable to provide push together or "snap together" type connectors which allow the tubing sections to be joined to each other or to system components quickly and without requiring special tools or adhesives.

A wide variety of different connector designs have been proposed for this purpose. These prior connector designs have varied from extremely simple one piece types using simple resilient tabs or fingers to complex multi-component designs using multiple swaged rings or other internal connector elements.

Although the simpler one-piece designs are typically the most desirable from the standpoint of manufacturing and use, it has generally been necessary to use expensive plastics in their manufacture in order to achieve the necessary strengths and resistance to pull-out. Accordingly, there has been a need for a simplified fitting design which is easy to manufacture and use, and which does not require the use of expensive materials or extremely complex molds and dies.

BRIEF STATEMENT OF THE INVENTION

The subject invention provides a two piece fitting design which overcomes the above mentioned problems and allows snap or push together connection of corrugated plastic tubing to provide an extremely strong and comparatively simple connecting joint. The design is such that it can be readily incorporated into a variety of types of adapter fittings or directly formed on junction boxes, outlet boxes, and similar system components.

In particular, according to the invention, the new fitting connection is intended for joining corrugated plastic tubing to associated structure and comprises a main fitting body of generally cylindrical configuration with an axially inwardly extending cylindrical chamber terminating in an inner end portion of a diameter $d_1$. A radially inwardly extending wall is located at the innermost end of the inner end portion. At the radially outer end of the chamber there is an opening which opens to the exterior of the body and has a diameter d which is greater than $d_1$. The chamber is arranged to receive plastic tubing having circumferential corrugations with a major outer diameter which is only slightly less than $d_1$ such that it can be positioned with an end portion extending axially into the chamber with the innermost end of the tubing abutting the circumferential wall. The tubing is retained in the main body in its located position within the chamber by retaining ring means which includes a cylindrical sleeve of a length no greater than the axial length of the outer portion of the chamber. The sleeve has an inner diameter of approximately the same diameter as that of the tube and a wall which is approximately equal to $\frac{1}{2}(d_2-d_1)$. The sleeve is positioned around the tube and is completely received in the outer portion of the chamber with the innermost end of the sleeve in engagement with the shoulder. This allows the sleeve to completely fill the available space between the tube and the outer end portion of the chamber. The sleeve further includes a plurality of pairs of circumferentially spaced slots which extend into the sleeve from the innermost end to define a plurality of resilient tabs having free ends extending toward the shoulder. Radially outward extending first detents are carried on the tabs adjacent their free ends at a location to enter into a circumferential corrugation on the tubing. Radially outward extending second detents are also carried on the exterior of the tabs to cooperate with radial openings formed through the fitting body. The second detents have inter-engaging surfaces cooperating with the radial openings for preventing axial withdrawal of the retaining ring sleeve from the chamber.

Through the use of a separate retaining ring completely confined within the main fitting body, the resulting fitting has the function and appearance of a single piece fitting. However, a significant improvement in strength and ease in molding results from this design. That is, the ring itself can, if desired, be made from a separate and stronger material than the main body section of the fitting. Additionally, the tabs and detents can be more readily formed because of their location on a separate and independent piece relative to the main fitting body. This also simplifies the design of the molds or dies.

In accordance with a more limited aspect of the invention, the radial openings are positioned at the intersection of the inner and outer portions of the chamber adjacent to the shoulder such that the sleeve is located at its inner end by engagement with the shoulder while the free ends of the tab are spaced from the main fitting body in a manner to allow them to have free radial flexing movement for insertion of the corrugated tubing.

In accordance with a further aspect, the free ends of the tabs are located in a common plane with the shoulder engaging end portions of the sleeve. Additionally, the first detents have an inclined face positioned so as to cause a radial inward camming of the tabs during installation of the retaining ring into the chamber.

As is apparent from the foregoing, a primary object of the invention is the provision of a highly simplified two-piece snap or press together fitting particularly suited for use in joining corrugated plastic tubing.

Yet another object of the invention is the provision of a fitting assembly of the type described wherein the main load carrying components of the fitting are formed on a separate retaining ring structure molded independently of the main fitting body.

A still further object is a provision of a snap together fitting of the type described wherein the fitting has the overall appearance and functioning of a simple one piece fitting.

A still further object is the fitting of the type described which is simple to manufacture and use, and which overcomes the problems inherent in prior fitting designs.

BRIEF DESCRIPTION OF THE DRAWINGS

The above and other objects and advantages will become apparent from the following description when read in conjunction with the accompanying drawings wherein:

FIG. 1 is an exterior plan view of a fitting formed in accordance with the subject invention and connected to a section of corrugated plastic tubing;

FIG. 2 is a cross-sectional view taken on line 2—2 of FIG. 1 and showing the relationship between the retaining ring member and the main fitting body (the section of corrugated tubing has been removed to more clearly show the details of the fitting assembly);

FIG. 3 is an enlarged pictorial view showing the main fitting body and the retaining ring prior to their assembly;

FIG. 4 is a longitudinal cross-sectional view through the main fitting body;

FIG. 5 is a longitudinal cross-sectional view through the retaining ring element; and, FIG. 6 an enlarged view of the circled area of FIG. 2 but showing the end portion of the corrugated tubing in place in the fitting assembly.

DETAILED DESCRIPTION OF THE PREFERRED EMBODIMENT

Referring more particularly to the drawings wherein the showings are for the purpose of illustrating a preferred embodiment of the invention only, and not for the purpose of limiting same, FIGS. 1, 2 and 6 best show the overall arrangement of a preferred form of the fitting assembly of the subject invention which generally comprises a main fitting body 10 and a retaining ring member 12 which cooperate to connect with the end portion of a corrugated plastic tubing 14. As is well known and readily understood, the main fitting body 10 could be formed integrally with an associated structure such as a switch box or the like. Also, it could have a duplicate arrangement on each end to allow direct end to end connection of separate tubing segments. Alternatively, as is well known, one end of the fitting body could have different types of connecting arrangements to allow the fitting to be connected to other structures or the like. This is readily recognized in the art but, in the subject embodiment the main fitting body 10 is shown as a generally cylindrical molded plastic structure having an axially extending chamber 16 which terminates in a cylindrical inner end portion 18. The inner end portion 18 is formed with a diameter $d_1$ which is only slightly greater than the maximum outer diameter of the tubing 14. The axially innermost end of the chamber section 18 is terminated by a circumferentially continuous wall 20. Wall 20 acts as the inward limit of the movement of the tubing 14 as best shown in FIG. 6. Further, the wall 20 acts to position the tube 14 relative to the retaining ring 12 in a manner to be described.

The chamber 16 further includes an outer cylindrical chamber portion 22 which opens to the exterior of the fitting body 10. The outer chamber portion 22 has a diameter $d_2$ which, as best shown in FIGS. 2 and 4, is relatively larger than diameter $d_1$. As previously mentioned, and as is apparent from the drawings, the two chamber portions 18 and 22 are axially aligned and join at a radially extending shoulder or face 24. As will become apparent hereafter, the face 24 acts at a positioning or limiting stop for locating the retaining ring member 12 in proper position within chamber 16.

As best shown in FIGS. 1, 3 and 4, the main fitting body 10 further includes a pair of diametrically opposed rectangular openings 28 positioned as shown. Note in particular that each of the openings 28 is position so as to have portions in both the inner and outer portions 18, 22 of the chamber 16. In particular, the openings have a limited extent located axially inwardly of the transition wall 24. The importance of this will subsequently become apparent.

As previously mentioned, the retaining ring member 12 acts to positively engage with the exterior of the corrugated tubing 14 and retain it locked in the chamber 16. The relationship between the retaining ring 12 and the main fitting body 10 is such that the tubing can be installed in the fitting by a manual snap or push together operation. In particular, as best shown in FIGS. 2, 3, 5 and 6, the retaining ring 12 includes a generally cylindrical sleeve-like body 30 which has an axial length l (See FIG. 3) which is no greater than the axial length $l_1$ of the outer chamber section 22. Ring 12 further has pairs of axially inward extending slots 32 formed at relatively closely spaced locations to define resilient fingers or tabs 34. In the embodiment under consideration, there are two sets of the slots 32 to define two diametrically opposed tabs or fingers 34 which have a circumferential extent which is slightly less than the total circumferential extent of each of the openings 28 (See FIG. 1). Each of the tabs 34 carry a first inwardly extending detent member 36 which is formed on the interior surface of the corresponding tab 34. Best shown in FIG. 6, each of the detents 36 have an axially outwardly facing surface 38 which is inclined in a manner to provide a radially outwardly directed camming force to the associated finger when the tubing 14 is inserted into the retaining ring. In this regard it should be noted that the internal open diameter of the retaining ring member 12 is only slightly greater than the outer maximum diameter of the tubing 14. Additionally the thickness of the sleeve wall is equal to approximately one-half of the difference between diameter $d_2$ and diameter $d_1$. Thus, when the retaining ring is in position as shown in FIGS. 2 and 6, it completely fills the open area between the inner surface of the chamber portion 16 and the exterior surface of the tubing 14. The positioning and location of the retaining ring 12 within the chamber 16 is determined by engagement between the inner end wall 40 and the transition shoulder 24. It should also be noted that in the subject embodiment the free end or radial inner most end of the tab portions 34 are located in the same plane as the end surface 40. As can be seen from FIG. 2, this causes the free end of each tab 34 to be spaced from the wall of the associated opening 28. This allows it to have free movement in the radial direction without the free end impinging on the wall surface surrounding opening 28.

The retaining ring 12 is maintained in position in the chamber 16 by second detents 44 which are carried on the exterior of each resilient finger 34. The detents 44 have a generally rectangular extending retaining face 46 which is adapted to engage behind the axial outermost wall of the openings 28 as can be seen in FIGS. 2 and 6. This engagement prevents axial withdrawal of the retaining member after it has been inserted in the chamber 16 to the position indicated. Further, it should be noted that the opposite sidewall 48 of each of the detents 44 is inclined at an angle as shown so as to provide a camming action to deflect the fingers 34 radially inward as the retaining ring is moved axially into the chamber 16 to the located position shown on FIGS. 2 and 6. To facilitate the installation of the retaining ring into the chamber 16 it is, of course, possible to make the retaining ring as a split ring so as to allow it have some degree of radial or diametrical compressibility.

With the arrangement thus far described it is possible to form the retaining ring from a different and more flexible or rigid plastic as required in comparison with the material from which the main fitting body is formed. Additionally, however, as can be seen from its external appearance the fitting has the overall appearance of a one piece fitting. Likewise, in use, a simple insertion of the tubing until its end engages the wall 20 is all that is necessary to provide a positive connection. With respect to this insertion it should, of course, be understood that the design and distance from wall 20 to the detents 36 is selected relative to the corrugation spacing to provide the desired engaging relationship.

This invention has been described with reference to a preferred embodiment. Modifications and alterations of the preferred embodiment will occur to others upon a reading and understanding of the subject specification. It is intended to include all such modifications and alterations as part of the invention insofar as they come within the scope of the appended claims.

Having thus described the invention, it is now claimed:

1. A fitting connection for joining corrugated plastic tubing to associated structure comprising:

a main fitting body of generally cylindrical configuration having an axially inwardly extending cylindrical chamber terminating in an inner end portion of a diameter $d_1$, said inner end portion terminating at its innermost end in a radially inwardly extending circumferential wall, the axial outer end of said chamber opening to the exterior of said body and having an open diameter $d_2$ which is greater than $d_1$, and a radially extending shoulder between said inner and outer end portions of said chamber;

a plastic tubing having circumferential corrugations with a major outer diameter which is only slightly less than $d_1$ having an end portion extending axially into said chamber from the exterior of said fitting with the innermost end of said tubing abutting said circumferential wall;

retaining ring means for retaining said tubing in said fitting body, said retaining ring means including a cylindrical sleeve of a length no greater than the axial length of the outer portion of said chamber, said sleeve having an open inner diameter of approximately $d_1$ and a wall approximately equal to $\frac{1}{2}(d_2-d_1)$, said sleeve surrounding said tubing and completely received in the outer portion of said chamber, a plurality of pairs of circumferentially spaced slots extending into said sleeve from the innermost end to define a plurality of resilient tabs having free ends extending toward said shoulder and spaced sections of said sleeve between adjacent tabs having inner ends in engagement with said shoulder to limit inward movement of said sleeve, radially inward extending first detents carried on the tabs adjacent their free ends at a location to enter into a circumferential corrugation on said tubing, radially outward extending second detents carried on the exterior of said tabs;

radially open slots formed through said fitting body adjacent said shoulder for receiving said second detents, said radially open slots and said second detents having inter-engaging surfaces lying generally in a plane generally perpendicular to the axis of said chamber for preventing axial withdrawal of said retaining ring means from said chamber; and, the free ends of said tabs terminating in a plane perpendicular to the axis of said chamber and said radially open slots intersecting said shoulder and having portions of said chamber.

2. A fitting connection as defined in claim 1 wherein said resilient tabs are arranged in diametrically opposed sets.

3. A fitting connector as defined in claim 1 wherein each of said tabs extends axially of said sleeve and wherein said first and second detents extend transverse of said tabs.

4. A fitting connection as defined in claim 1 wherein each of said tab carries both first and second detents.

5. A fitting connection as defined in claim 2 wherein said wall is circumferentially continuous about the innermost end of said chamber.

* * * * *